Nov. 29, 1938.    A. G. WISE ET AL    2,138,531
SPINNER MOTOR
Filed Jan. 2, 1937    4 Sheets-Sheet 3

Inventors
Arthur G. Wise
Clyde W. Mapes
William A. Chrzpt
Henry O. Fuchs
by Spencer Hardman & Fehr
their Attorneys Nov. 29, 1938.  A. G. WISE ET AL  2,138,531
SPINNER MOTOR
Filed Jan. 2, 1937  4 Sheets-Sheet 4

Inventors
Arthur G. Wise
Clyde W. Mapes
William A. Chryst
Henry O. Fuchs by Spencer Hardman & Fehr
Their Attorneys Patented Nov. 29, 1938

2,138,531

UNITED STATES PATENT OFFICE 2,138,531

SPINNER MOTOR

Arthur G. Wise, Clyde W. Mapes, and William A. Chryst, Dayton, Ohio, and Henry O. Fuchs, Detroit, Mich., assignors to General Motors Corporation, Detroit, Mich., a corporation of Delaware Application January 2, 1937, Serial No. 118,858

22 Claims. (Cl. 117—27.6)

This invention relates to spinner motors for use in the manufacture of artificial silk or rayon.

It is one of the main objections to the known types of spinner motors that the permissible margin of unbalance is frequently exceeded by the unbalance of the bucket which is caused by a certain amount of distortion of the spinning bucket, by unevenly distributed rayon threads therein, and by other causes. The result is an unstable or rough running of the spinner motor. Rough running of a spinner motor causes undue stresses in the shaft which lead frequently to breaks, and the shaft bearings become rapidly useless through wear. The useful life of these spinner motors is, consequently, unusually short.

It is the primary aim and object of the present invention to construct a spinner motor which will run smoothly or stably even under a much greater unbalance than is required of a spinner motor in operation.

To attain smooth or stable operation of the spinner motor under a greater unbalance than was heretofore possible, the bucket must be permitted to rotate about a free axis, and the free axis should be deflected as little as possible from the geometric axis. This deflection can be approximately determined in dividing the unbalance by the difference between the axial and transverse moments of inertia of the rotating parts of the spinner motor. The axial moment of inertia of a conventionally shaped bucket approximates its transverse moment of inertia, resulting in a wide deflection of the free axis from the geometric axis. To obtain a small deflection at the usual unbalance of the bucket, the difference between the two moments of inertia is increased by providing a counterweight on the bucket in such manner that the combined transverse moment of inertia of the bucket and counterweight is considerably increased over that of the bucket alone, while their combined axial moment of inertia is little increased over that of the bucket alone. Since a moment of inertia is known to grow with the square of the radius of gyration, the transverse radius of gyration of the counterweight is selected as large as possible so that the counterweight requires only a comparatively small mass. This small mass is distributed concentrically of, and in close proximity to, the geometric axis of the bucket so that their combined transverse radius of gyration is larger than that of the bucket alone, and their combined axial radius of gyration is smaller than that of the bucket alone. In this manner is the difference between the two combined moments of inertia increased, and the deflection thereby decreased to a minimum.

A flexible shaft is driven at one end and drives the bucket at the other end, leaving a considerable length of the shaft free to bend under the mass forces of the bucket and counterweight. Since a flexible shaft will bend into the approximate position of a free axis, it will also pass substantially through the new center of gravity of the unbalanced bucket and counterweight. The flexible shaft has, therefore, the advantage that it can carry an unbalanced mass at high speeds without becoming unstable. However, the flexible shaft is also required to carry the unbalanced mass safely through the critical speed range, and to operate at high speed without too much precession.

Regarding the safe passage of the unbalanced mass through the critical speed range, the mere use of a flexible shaft secures the advantage that the critical speed range is considerably below the normal operating speed and, hence, never interferes with the latter. The motor is, moreover, given sufficient torque to accelerate comparatively rapidly so that the vibrations of the shaft within the critical speed range have not sufficient time to build up to dangerous amplitudes. A vibration damping device is also provided, which absorbs part of that energy in the vibrating system which functions to increase the amplitude of the vibrations.

The precession movement is a rotary motion of the bucket and shaft which is separate from, and superimposed upon, the normal rotation of the bucket and shaft. This precession movement must be slow and kept small in amplitude in order to prevent a weakening or even breaking of the fine rayon thread which is constantly fed into the bucket through a thread guide. The spinning bucket and counterweight act as a gyroscopic pendulum, the superimposed rotary motion or precession of which increases with any centralizing couple that tends to return the pendulum into the position in which it will rotate about its geometric axis. Consequently, the smaller the centralizing force is, which tends to force the shaft from its approximate alignment with a free axis into alignment with its geometric axis, the slower is the precession.

It was found by experiments that a frictional resistance against precession, for instance of a damping device, results in a rapid and jerky precession. While this phenomenon cannot be explained satisfactorily as yet, it is believed that such friction causes rapid variations of the centralizing couple and, through interaction with the internal friction of the flexible shaft and the air drag on the eccentrically rotating bucket, induces a precession movement of its own which is believed to be superimposed upon the first or gyroscopic precession, thereby creating the aforementioned condition of rapid and jerky precession. It is, therefore, of great importance to have a minimum frictional resistance against precession.

Further objects and advantages of the present invention will be apparent from the following description, reference being had to the accompanying drawings wherein a preferred embodiment of the present invention is clearly shown.

Figure 1:
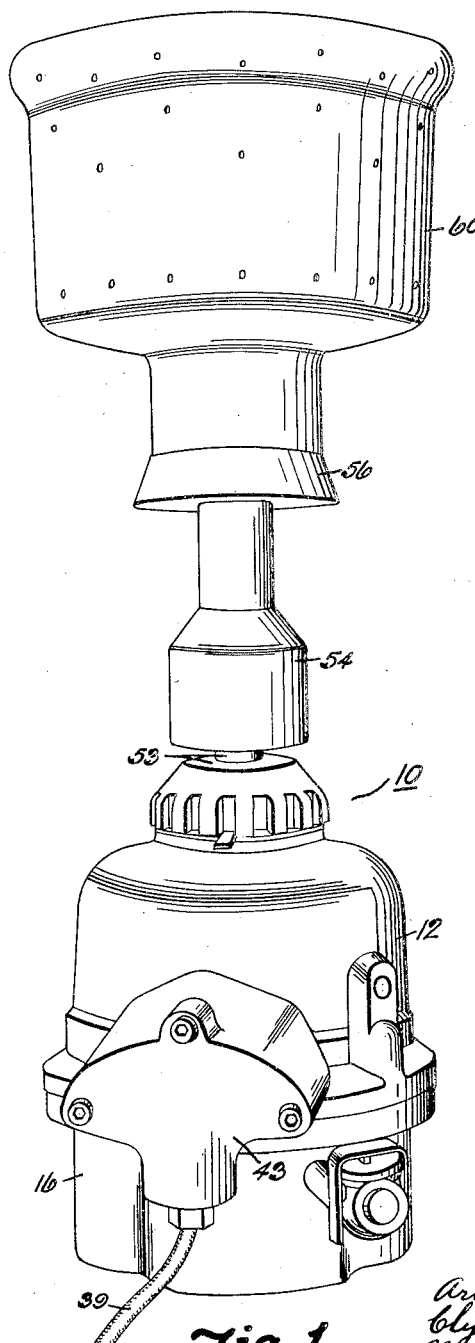
Fig. 1 is a perspective view of a spinner motor which embodies the present invention.

Referring to the drawings, the spinner motor 10 has a housing 12 which is provided with a stator 14 and is mounted on a base 16. This base serves also as a reservoir for a lubricant supply 18. A rotor 20 is mounted on a hub 21 which is splined at 22 to a vertical shaft 24, journaled in a ball bearing 26 which is carried by a sleeve 28. The sleeve 28 is splined at 30 to a boss 32 of the motor housing 12, and is normally retained with its shoulder 34 in engagement with a shoulder 36 of said boss by means of a compression spring 38. Wires 39 connect a suitable source of electric power (not shown) with terminals 41, which are in turn connected with the stator 14 of the spinner motor. The terminals 41 are preferably covered such as at 43 in Fig. 2. The lower end of the shaft 24 is journaled in a block 40 of a hydraulic damping device which will be described later. The shaft 24 rests with its shoulder 42 on the inner race 44 of the ball bearing 26. The shaft 24 is permitted slightly to oscillate about the ball bearing 26 as a fulcrum. The horizontal center plane A—A of the rotor 20 passes through the ball bearing 26, wherefore slight oscillations of the shaft about its fulcrum cause a minimum change in the uniformity of the annular gap between the stator 14 and the rotor 20. Received in a conical socket portion 50 of the stiff shaft 24 is a flexible steel shaft 52 which passes through an end cover 53 of the motor housing 12 and carries at its upper end a counterweight 54 with a bucket seat 56. This bucket seat may be of any suitable design and construction, the present seat being of a molded substance and having an annular groove 58 which receives a leather or rubber ring 59 of the bucket 60. Centrifugal force throws the ring 59 of the bucket into gripping engagement with the annular groove wall 61, and thus establishes an automatic coupling between the shaft and bucket upon rotation of the shafts 24, 52.

The counterweight has its greatest mass accumulation at a place most remote from the bucket seat 56 in order to obtain a greatest possible transverse moment of inertia and a smallest possible axial movement of inertia for earlier explained reasons.

Figure 2:
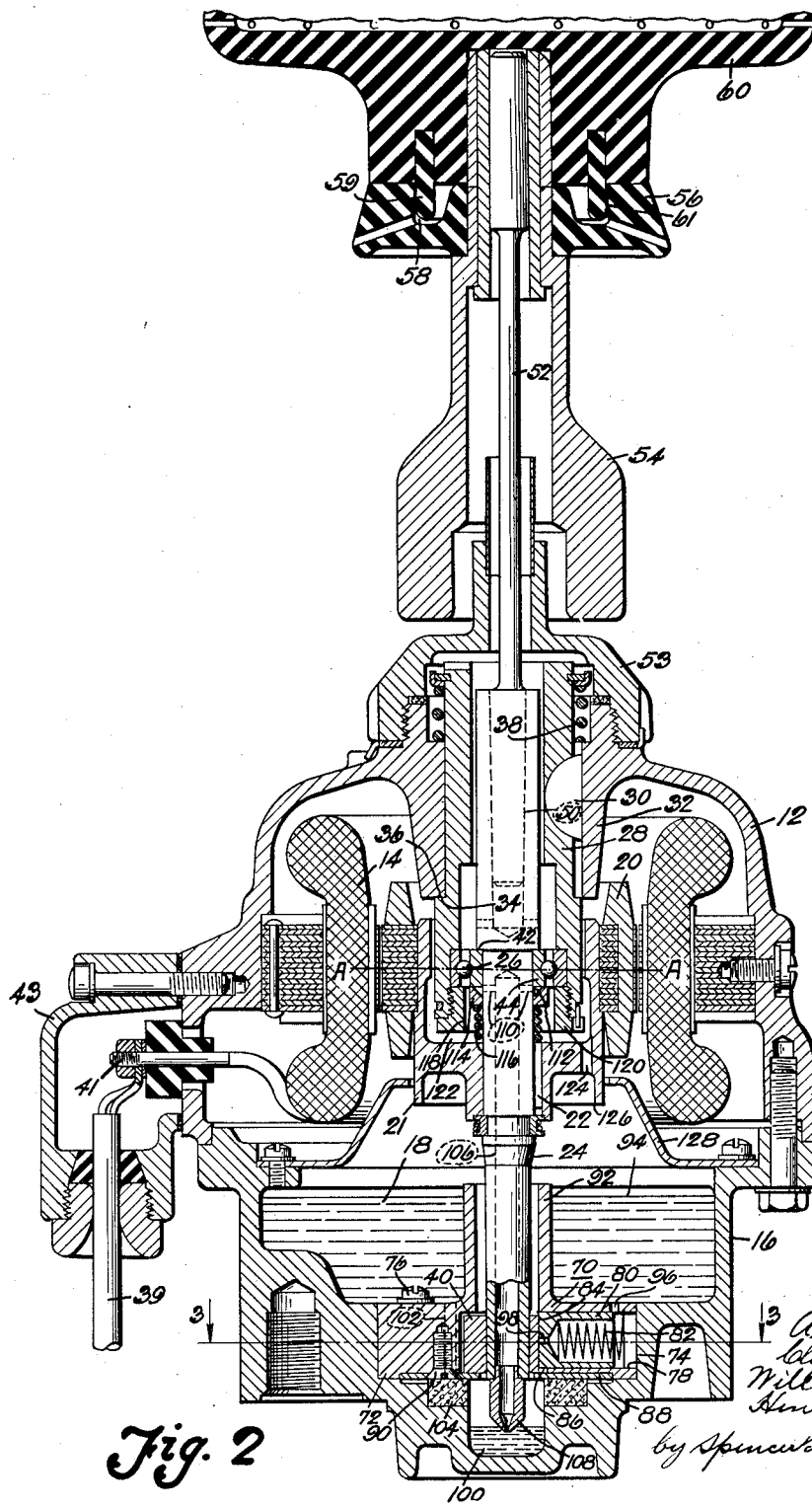
Fig. 2 is a longitudinal section through the spinner motor.
Figure 3:
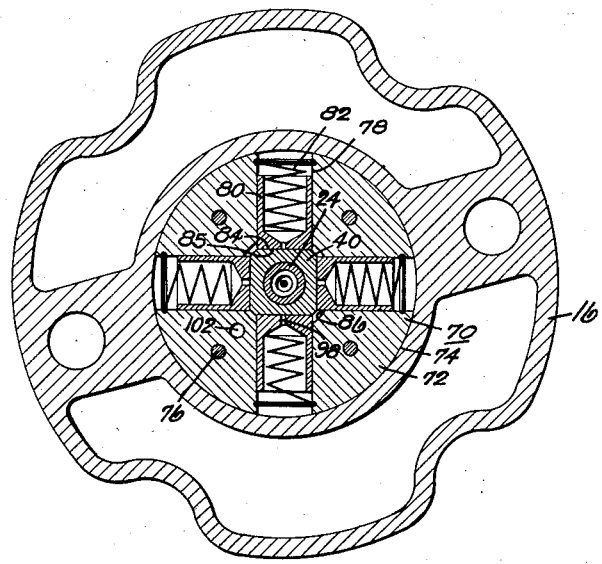
Fig. 3 is a transverse section taken on the line 3—3 of Fig. 2.

Referring now to Figs. 2 and 3, the damping device 70 includes a cylindrical housing 72 which is secured in an annular recess 74 of the base 16 by screws 76, and provides four equiangularly spaced cylinder bores 78 in which plungers 80 are received. To reduce their weight to a minimum, these plungers are made hollow. Springs 82 force the plungers 80 with their front faces 84 into engagement with adjacent faces 85 of the earlier mentioned block 40 which journals the lower end of the shaft 24. This block 40 is located in an annular recess 86 of the cylindrical housing 72 which is large enough to permit considerable movement of said block in any linear direction in a horizontal plane. To retain block 40 in the annular recess 86, a ring plate 88 is screwed at 90 to the housing 72. A hollow extension 92 of the housing 72 extends beyond the level 94 of the lubricant supply 18. All cylinders 78 communicate with the lubricant supply 18 through ducts 96 in the housing 72 so that each cylinder 78 is filled with lubricant. Figure 2 shows the motor in the rest position in which the spring-urged plungers 80 maintain block 40 as well as shaft 24 in the illustrated, centralized position. Upon starting the motor, the rotary elements 20, 24, 52 and 60 of the motor gain fairly rapid momentum. With the approach of these rotating elements to critical speed, they begin to vibrate, at first slow and at small amplitude. The ducts 96 are so located relative to the plungers 80 that the latter are forced into a position to intercept communication through said ducts when the vibrations of the shaft 24 are still comparatively slow and of small amplitude. Thus, lubricant is trapped in certain cylinders 78 which resists an increase of the amplitude of the shaft vibrations, and more particularly delays their increase in amplitude to such an extent that the vibrations of the shaft 24 are still harmless when the rotating elements pass beyond the upper limit of the critical speed range. It is, of course, understood that two plungers 80 at the most have a simultaneous damping effect on the shaft 24. The plungers 80 are further provided with ducts 98 through which lubricant will escape from the plungers as soon as block 40 moves away therefrom, thus enabling the weak springs 82 to cause the pistons to substantially follow the rapid movements of block 40.

The base 16 provides also an auxiliary lubricant reservoir 100 which is in communication with the main lubricant supply 18 through one or more passages 102 in the housing 72 and a felt ring 104. The lubricant gravitates through the passage 102 and felt ring 104 to the auxiliary reservoir 100. The stiff shaft 24 is centrally recessed at 106 and provided at its lower end with a nozzle 108 which dips into the auxiliary lubricant supply in reservoir 100. Two diametrically opposite holes 110 in the shaft 24 provide communication between the central recess 106 of said shaft and a plurality of radial notches 112 of a loose collar 114 on the shaft 24. This collar 114 is urged into engagement with the inner bearing race 44 by a compression spring 116. When the rotary mass of the spinner motor rotates, centrifugal force compels lubricant from the auxiliary reservoir 100 to rise in the cone-shaped entrance hole of the nozzle 108 and in the central recess 106 of shaft 24, until the lubricant level reaches the shaft holes 110 and is thrown by centrifugal force through the radial collar notches 112 and against the two races of the ball bearing 26. The lubricant returns downwardly along the inner wall 118 of a bearing retainer 120 and flows into a lubricant trap 122 which is provided by the rotor hub 21, and from where the lubricant escapes through a duct 124 to the lower edge 126 of said rotor hub. The lubricant is then thrown by centrifugal force against a baffle plate 128 which guides the lubricant into the main reservoir 18. In this way is the ball bearing 26 automatically lubricated without danger that lubricant may reach the rotor and stator of the spinner rotor.

It can be understood from the foregoing description that the damping device 70 acts also as a centralizing bearing for the shaft 24 due to the action of the equi-angularly spaced spring-urged plungers 80. The damping device 70 could also be located at, and cooperate with, the top of the stiff shaft 24; however, the illustrated location of the damping device 70 facilitates the construction of the spinner motor since there is a direct gravity feed of lubricant from the main supply 18 to the cylinders 78 of the damping device. As already explained, the damping device is fully effective while the rotary mass of the spinner motor passes through critical speed.

The precession movement of the shaft 24, 25 and bucket 64 is comparatively slow and small in amplitude due to the particular construction of the counter-weight 54 which is responsible for a small deflection of the free axis from the geometric axis of the rotating mass of the spinner motor. The precession is in effect so small in amplitude that the plungers 80 of the damping device move very little from the central position shown in Fig. 2; it certainly appears that these plungers never move far enough to intercept communication through the ducts 96. The spring-urged plungers 80 have, therefore, only a negligible damping effect on the precessing shaft 24. To reduce frictional resistance against precession of the shaft 24 to a minimum, the springs 82 of the plungers 80 are made as weak as possible so as not unduly to resist movement of the block 40 relative to the plungers 80 in the cylinders 78 and thereby accelerate the precession movement and increase its amplitude.

Figure 4:
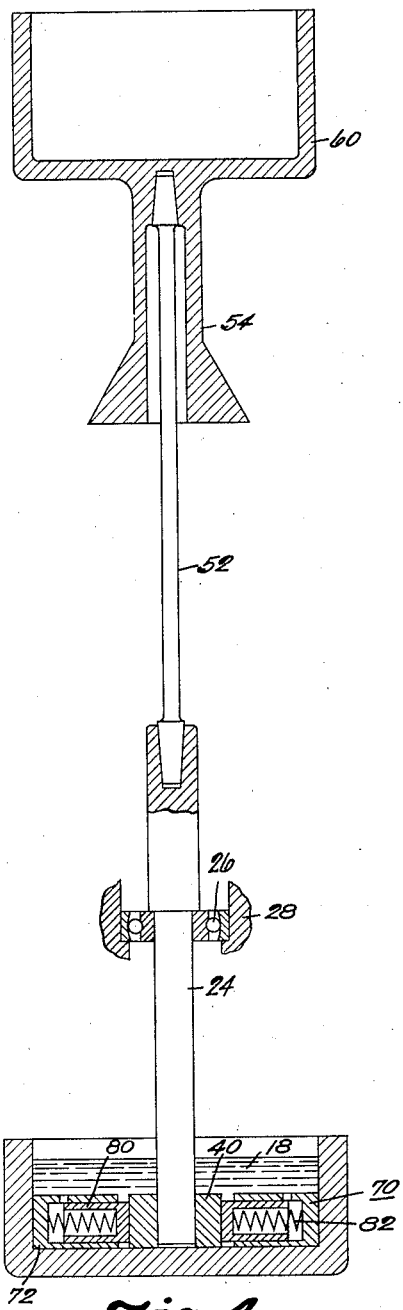
Figs. 4 and 5 are diagrammatic illustrations of the spinner motor at rest and in operation, respectively.
Figure 5:
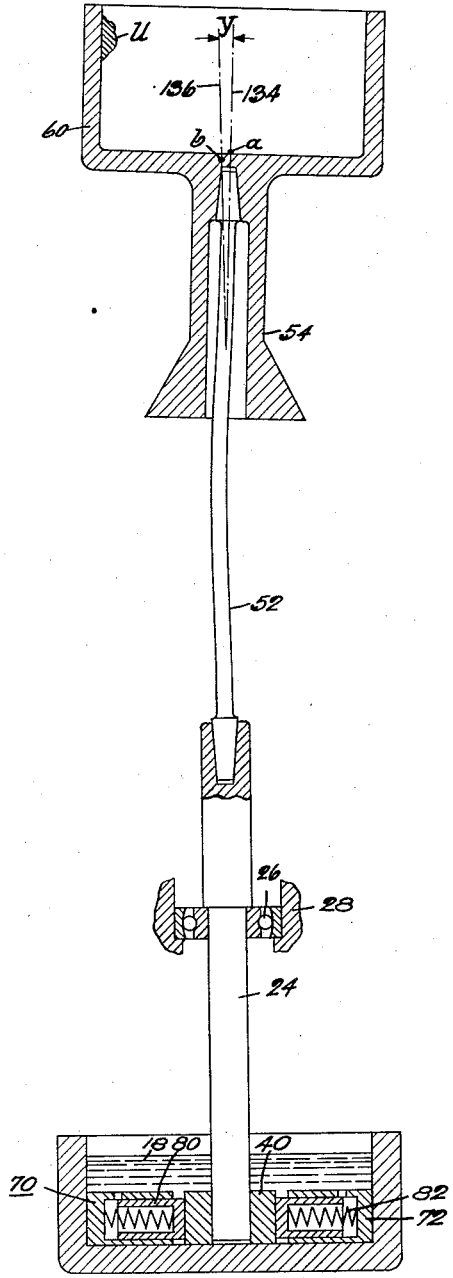

Fig. 4 is a diagrammatic illustration of the spinner motor at rest, while Fig. 5 illustrates the condition of the rotating mass of the spinner motor while in operation. The bucket 60 is illustrated as carrying the unbalance U, whereby the free axis 136 is deflected from the geometric axis 134 at the comparatively small angle Y. It can also be seen in Fig. 5 that the free axis 136 passes through the new center of gravity b of the unbalanced bucket, said new center of gravity being at a different location than the old center of gravity a of the balanced bucket 60. The acuteness of the deflection angle Y between the free axis and geometric axis is due to the particular construction of the counterweight. The approximate bending of the flexible shaft 52 during normal operation of the spinner motor is shown in Fig. 5.

The instant spinner motor has been found to travel comparatively smoothly through the critical speed range and to operate very smoothly under the usual unbalanced condition of the spinning bucket.

Figures 6, 7:
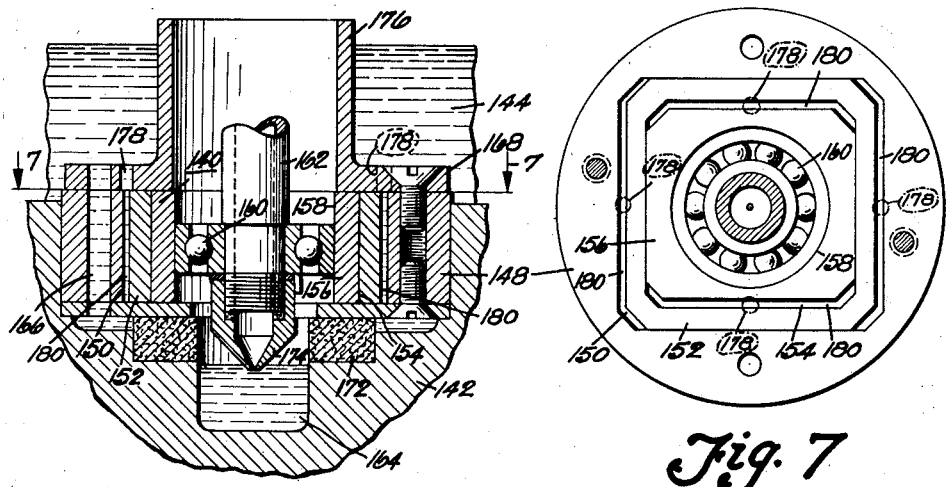
Fig. 6 is a fragmentary section through a modified, hydraulic damping device.
Fig. 7 is a section taken on the line 7—7 of Fig. 6.

To reduce the frictional resistance against precession of the shaft even more than in the previously described damping device 70, a modified damping device 140 is illustrated in Figs. 6 and 7. The base 142 of the spinner motor is again used as a reservoir for a lubricant supply 144. Received in an annular recess of said base 142 is a cylindrical member 148 which is provided with a rectangular recess 150, wherein a rectangular block 152 is reciprocable in one direction in a horizontal plane. Block 152 is also provided with a rectangular recess 154 wherein another rectangular block 156 is reciprocable in a horizontal plane and in a direction at right angles to that of block 152. Received in a cylindrical bore 158 of the last mentioned block 156 is a ball bearing 160 which is carried by a stiff shaft 162 which may be similar to the earlier described shaft 24 for all intents and purposes. The base 142 also provides an auxiliary reservoir 164 for lubricant which gravitates from the main supply 144 through one or more passages 166 and through a felt ring 172 to the auxiliary reservoir 164. The lower end of the shaft 162 carries a nozzle 174 through which lubricant from the auxiliary reservoir 164 is drawn into the centrally recessed shaft 162 by means of a partial vacuum which is created in said recessed shaft in the same manner as in the shaft 24 of the spinner motor in Fig. 2. A cover 168, secured to block 148, has a vertical extension 176 which reaches beyond the level of the lubricant supply 144. This cover 168 is also provided with four ducts 178 which provide communication between the main lubricant supply 144 and the comparatively small spaces 180 between the blocks 148, 152 and 156 (observe dot-and-dash position of ducts 178 in Fig. 7). These spaces 180 are, therefore, constantly filled with lubricant which will be displaced through the ducts 178 by the movement of the blocks 152 and 156 relative to each other and to the stationary block 148 when the rotating mass of the spinner motor, including the shaft 162, passes through critical speed. Such displacement of lubricant from the spaces 180 has naturally a damping effect on the shaft vibrations which increases with the increase of the amplitude of the vibrations. The damping effect of this modified device 140 is, however, less abrupt than that of the earlier described damping device 70, since communication through the ducts 178 is never entirely intercepted. The frictional resistance against precession of the shaft is appreciably reduced in this modified device since no springs are used, wherefore the precession movement of the shafts and bucket is smaller with the present modified damping device than with the previously described device 70.

While the embodiment of the present invention as herein disclosed, constitutes a preferred form, it is to be understood that other forms might be adopted, all coming within the scope of the claims which follow.

What is claimed is as follows:

1. A spinner motor comprising, in combination, a motor frame; a stator on the frame; a rotor; a rotary shaft carrying the rotor; a bearing journalling the shaft centrally of the rotor, said bearing being carried by the frame and providing a pivotal support for oscillatory movement of the shaft; a bucket carried at one end of the shaft; a certain mass carried by the shaft and substantially rigidly connected thereto, said mass being so distributed around the shaft that the difference between the combined transverse and axial moments of inertia of the bucket and mass is very large; and a damper to resist oscillation of the shaft.

2. A spinner motor comprising, in combination, a motor frame; a stator on the frame; a rotor; a rotary shaft carrying the rotor; a flexible metallic extension on the shaft; a bearing journaling the shaft centrally of the motor, said bearing being carried by the frame and providing a pivotal support for oscillatory movement of the shaft; a bucket carried by the extension; a certain mass suspended from and directly connected to the extension, said mass being so distributed around the extension that the difference between the combined transverse and axial moments of inertia of the bucket and mass is very large; and a damper to resist oscillation of the shaft.

3. A spinner motor comprising, in combination, a motor frame; a stator on the frame; a rotor; a rotary shaft carrying the rotor; a journal bearing for the shaft, said bearing providing a pivotal support for oscillatory movement of the shaft; a bucket carried at one end of the shaft; a certain mass carried by the shaft, said mass being so distributed around the shaft that the difference between the combined transverse and axial moments of inertia of the bucket and mass is very large; and a substantially friction-free damper to resist oscillation of the shaft.

4. A spinner motor comprising, in combination, a motor frame; a stator on the frame; a rotor; a rotary shaft carrying the rotor; a journal bearing for the shaft, said bearing providing a pivotal support for oscillatory movement of the shaft; a bucket carried at one end of the shaft; a certain mass carried by the shaft, said mass being so distributed around the shaft that the difference between the combined transverse and axial moments of inertia of the bucket and mass is very large; and a hydraulic damper to resist oscillation of the shaft.

5. A spinner motor comprising, in combination, a motor frame; a stator on the frame; a rotor; a rotary shaft carrying the rotor; a flexible extension on the shaft; a journal bearing for the shaft, said bearing providing a pivotal support for oscillatory movement of the shaft; a bucket carried by the extension; and a hydraulic damper to resist oscillation of the shaft.

6. A spinner motor comprising, in combination, a motor frame; a stator on the frame; a rotor; a rotary shaft carrying the rotor; a flexible extension on the shaft; a bearing journaling the shaft centrally of the rotor, said bearing being carried by the frame and providing a pivotal support for oscillatory movement of the shaft; a bucket carried by the extension; and a hydraulic damper to resist oscillation of the shaft.

7. In a spinner motor, the combination of a shaft; a relatively stationary journal bearing for the shaft, said bearing providing a pivotal support for oscillatory movement of the shaft; and a rotor mounted on the shaft centrally of the bearing.

8. In a spinner motor, the combination of a rotary metallic shaft having a portion adapted to flex transversely of the axis of the shaft; a bucket at one end of the shaft; and a counterweight directly secured to the shaft near the bucket, said weight being so distributed around the shaft that the difference between the combined transverse and axial moments of inertia of the bucket and weight is very large.

9. In a spinner motor, the combination of a substantially vertical, rotary shaft having a metallic extension of reduced section which is adapted to flex; a bucket at the top of the shaft extension; and a counterweight substantially rigidly connected to the shaft extension near the bucket, said counterweight being so distributed around the shaft that its transverse moment of inertia is very large and its axial moment of inertia is very small.

10. In a spinner motor, the combination of a substantially vertical, rotary metallic shaft having a relatively flexible portion; a bucket at the top of the shaft; and a counterweight rigidly suspended from the shaft near the bucket and surrounding the flexible portion, said weight being so distributed around the shaft that its transverse radius of gyration is very large and its axial radius of gyration is very small.

11. In a spinner motor, the combination of a substantially vertical, rotary shaft having a portion near the top reduced in section and adapted to flex; a bucket at the top of the shaft; and a long cylinder coaxially of the shaft and suspended from and rigidly connected to the shaft near the bucket, the mass of the cylinder being distributed in close proximity to the shaft so that its transverse radius of gyration is very large and its axial radius of gyration is very small.

12. In a spinner motor, the combination of a substantially vertical, rotary shaft having an inherently flexible portion; a bucket at the top of the shaft; and a predetermined mass suspended from and rigidly connected to the shaft near the bucket and adapted to be located within a certain range longitudinally of the shaft, a small amount of said mass being distributed around and in close proximity to the shaft adjacent the bucket, and the larger amount of the mass being distributed around the shaft remote from the bucket.

13. In a spinner motor, the combination of a substantially vertical, rotary shaft oscillatable intermediate its ends about a fulcrum; and a hydraulic damper to resist oscillation of the shaft.

14. In a spinner motor, the combination of a substantially vertical, rotary shaft oscillatable intermediate its ends about a fulcrum; and a hydraulic damper to resist oscillation of the shaft, said damper including yielding means for centralizing the shaft.

15. In a spinner motor, the combination of a substantially vertical, rotary shaft oscillatable about a fulcrum; equi-angularly spaced, horizontal cylinders around and spaced from the shaft, said cylinders being open toward the shaft; pistons movable in said cylinders; a journal bearing for the shaft in horizontal alignment with the pistons and movable with the oscillating shaft between the pistons; and means having openings laterally of the cylinders and providing communication between a liquid supply and each cylinder, said openings being so located that communication therethrough is intercepted by the pistons to an extent dependent upon the displacement of the pistons by the oscillating shaft.

16. In a spinner motor, the combination of a substantially vertical, rotary shaft oscillating about a fulcrum; a housing providing four equi-angularly spaced, horizontal cylinders around and spaced from the shaft, said cylinders being open toward the shaft and said housing having ducts laterally of the cylinders to provide communication between a liquid supply and each cylinder; pistons movable in the cylinders; a journal bearing for the shaft in horizontal alignment with the pistons and movable with the oscillating shaft between the cylinders; and weak springs in the cylinders to retain the pistons in engagement with the bearing, the ducts being so located that communication therethrough is intercepted by the pistons to an extent dependent upon the displacement of the pistons by the oscillating shaft.

17. In a spinner motor, the combination of a substantially vertical, rotary shaft oscillatable about a fulcrum; a housing providing four equi-angularly spaced, horizontal cylinders around and spaced from the shaft, said cylinders being open toward the shaft and said housing having ducts laterally of the cylinders to provide communication between a liquid supply and each cylinder; pistons movable in the cylinders; a rectangular block journaling the shaft, said block being in horizontal alignment with the pistons and movable with the oscillating shaft between the cylinders; and weak springs in the cylinders to retain the pistons in engagement with the flat sides of the block, the ducts being so located that communication therethrough is intercepted by the pistons to an extent dependent upon the displacement of the pistons by the oscillating shaft.

18. In a spinner motor, the combination of a substantially vertical, rotary shaft; a journal bearing for the shaft, said bearing providing a pivotal support for oscillatory movement of the shaft; a reservoir holding a supply of lubricant; means for conducting lubricant from the reservoir to the bearing; a housing below the reservoir and providing four equi-angularly spaced horizontal cylinders around and spaced from the shaft, said cylinders being open toward the shaft and said housing having ducts laterally of the cylinders to provide the sole communication between the lubricant supply and each cylinder; pistons movable in the cylinders; a journal bearing for the shaft in horizontal alignment with the pistons and movable with the oscillating shaft between the cylinders; and weak springs in the cylinders to retain the pistons in engagement with the bearing, the ducts being so located that communication therethrough is intercepted by the pistons to an extent dependent upon the displacement of the pistons by the oscillating shaft.

19. In a spinner motor, the combination of a substantially vertical, rotary shaft oscillatable about a fulcrum; a stationary housing providing a horizontal cylinder; a double acting piston in said cylinder, said piston having a central opening forming together with two opposite walls of the housing a second horizontal cylinder; and a second double-acting piston movable with the oscillating shaft and in said second cylinder at right angles to the first mentioned piston, and said housing having ducts laterally of the cylinders to provide the sole communication between a liquid supply and each cylinder, said ducts being so located that communication therethrough is intercepted by the pistons to an extent dependent upon the displacement of the pistons by the oscillating shaft.

20. In a spinner motor, the combination of a substantially vertical, rotary shaft oscillatable about a fulcrum; a stationary housing providing a horizontal, rectangular chamber; a rectangular, double acting piston in said chamber, said piston having a central, rectangular slot forming together with two opposite walls of the housing a second horizontal rectangular chamber; and a second rectangular, double acting piston movable with the oscillating shaft and in said second chamber at right angles to the first mentioned piston, and said housing having ducts laterally of the chambers to provide the sole communication between a liquid supply and each chamber, said ducts being so located that communication therethrough is intercepted by the pistons to an extent dependent upon the displacement of the pistons by the oscillating shaft.

21. In a spinner motor, the combination of a substantially vertical shaft; a journal bearing for the shaft, said bearing providing a pivotal support for oscillatory movement of the shaft; a rotor carried by and slidable axially of the shaft, means on the shaft providing a stationary seat for the rotor; and means interposed between the bearing and rotor yieldably urging the rotor toward the stationary seat.

22. A motor comprising, in combination, a motor frame; a stator on the frame; a substantially vertical shaft; a rotor magnetically associated with the stator and drivingly mounted on the shaft; a bearing substantially centrally located axially with respect to the rotor rotatably supported by the frame, said bearing rotatably supporting the shaft and providing a pivotal support for oscillatory movement of the shaft; a damper for resisting oscillatory movement of the shaft; an extension on the upper end of the shaft, said extension being inherently resilient; and a counterweight rigidly mounted on the upper end of the shaft extension and extending downwardly around the extension.

ARTHUR G. WISE.
CLYDE W. MAPES.
WILLIAM A. CHRYST.
HENRY O. FUCHS.